May 29, 1934.        D. G. ROOS ET AL        1,960,512
                        TRANSMISSION
               Filed Dec. 17, 1930        2 Sheets-Sheet 1

Fig. 1

INVENTOR.
Delmar G. Roos and Harold E. Churchill
BY
P. W. Pomeroy
ATTORNEY.

May 29, 1934.  D. G. ROOS ET AL  1,960,512

TRANSMISSION

Filed Dec. 17, 1930  2 Sheets-Sheet 2

INVENTOR.
Delmar G. Roos and Harold E. Churchill
BY
P. W. Pomeroy
ATTORNEY.

Patented May 29, 1934

1,960,512

UNITED STATES PATENT OFFICE 1,960,512

TRANSMISSION

Delmar G. Roos and Harold E. Churchill, South Bend, Ind., assignors, by mesne assignments, to Free Wheeling Patents Corporation, South Bend, Ind., a corporation of Delaware Application December 17, 1930, Serial No. 502,942

21 Claims. (Cl. 192—113)

This invention relates to improvements in lubricating systems for variable speed transmissions and deals more specifically with means for lubricating the gear and clutch elements of an overrunning or free wheeling type of transmission.

In overrunning or free wheeling types of transmissions, one or more one-way acting clutch structures are provided to permit the driven shaft to overrun under its own momentum relative the drive shaft. In some transmissions of this type, independent clutch structures are provided for any desired number of different speed drives, while in others the clutch structures for two drives are combined in different ways to eliminate as far as possible some of the elements which are duplicated in the independent structures. The actual use of overrunning transmissions as stock equipment in motor vehicles presents a new problem in transmission lubrication, and that problem requires particular consideration when independent clutch structures are used and especially when the clutch structures for two drives are combined, as noted above. It has been determined that the splash of lubricant in transmission casings, usually relied upon to lubricate the gears of the various speed drives, is not sufficient to properly lubricate the clutch structures, and particularly the combined types due to the extreme compactness of the same.

It therefore is a primary object of this invention to provide a system for lubricating the overrunning clutch structure or structures and/or the gears of variable speed transmissions.

A further object of the invention is to provide a novel form of pump for forcing lubricant to the various parts of a variable speed transmission, said pump preferably being actuated by the normal operation of the transmission mechanism and, in the preferred form of the invention illustrated and described herein, without the use of any additional transmission or drive.

A still further object of the invention is the provision of a lubricant feeding pump for a transmission which requires no separate casing or housing structure, said pump being built into the transmission mechanism so as to be housed thereby.

Another object of the invention is to provide a lubricating system for transmissions which is of exceedingly simple construction, one which will operate without any special attention or consideration on the part of the owner of the vehicle equipped with the same, and one which may be built into a transmission without material alteration of the latter.

Other objects and advantages of the invention will be apparent during the course of the following description:

In the accompanying drawings forming part of this specification and in which like numerals are employed to designate like parts throughout the same, Figure 1 is a vertical longitudinal sectional view of a transmission including an overrunning clutch structure for certain forward speed drives and a special lubricating system for said clutch structure and/or some of the gear elements.

Figure 2:
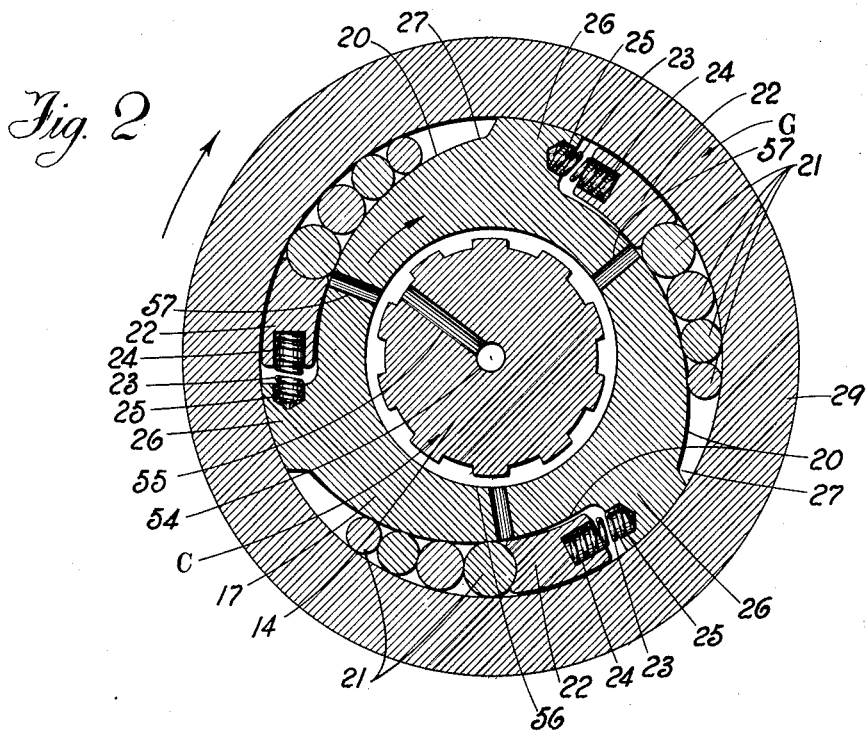
Figure 2 is a detail transverse sectional view taken on the line 2—2 of Figure 1 showing the one-way acting clutch structure incorporated in the transmission illustrated in Figure 1.

Briefly describing the invention for the purpose of enabling those skilled in the art to readily understand the mode of operation of the invention, the same consists of a transmission casing or housing A having suitably mounted therein a drive shaft B and a driven or transmission shaft C. These shafts B and C are arranged in axial alignment with each other and are telescopically associated at their adjacent ends through the medium of the anti-friction bearing structure D. A countershaft E is mounted in the casing A and has associated therewith a sleeve F which rotates relative the countershaft E and carries various gears included in the different speed drives.

A combined one-way acting clutch structure and drive connection G is provided for establishing connections for two different speed drives from the drive shaft B to the driven shaft C. This unit G permits the driven shaft to be driven by the drive shaft at two different forward speeds and also permits or prevents, at the will of the operator, the driven shaft to overrun under its own momentum, relative the drive shaft.

The various gears forming the different speed drives of a transmission usually are lubricated by the splash of lubricant caused by the relative rotation of the various gears. It has been determined that the clutch structures incorporated in an overrunning clutch type of transmission do not receive sufficient lubrication if the ordinary splash method is relied upon. For this reason, a force feed pump structure H is provided for feeding lubricant through a system of passages I to the clutch structure or structures. This system of passageways, if desired, may include one or more of the sets of gears forming a part of the different speed drives.

The invention now will be described in detail for affording a complete understanding of all of the various elements, features of construction, and mode of operation:

The transmission casing or housing A may take any desired form and is designed to permit the drive shaft B to project into the interior of the same at one end thereof. The outer end of this drive shaft is intended to be connected to an engine or prime mover of any suitable form and preferably through a controllable clutch structure, not shown. The inner end of the drive shaft B is supported by the anti-friction bearing structure D and has formed thereon a gear 6. Inwardly of the gear 6, the drive shaft B is increased in diameter and has formed on its periphery a set of clutch teeth 7. The portion of the drive shaft B having formed thereon the gear 6 and the clutch teeth 7 is hollowed out to provide a bearing receiving pocket 8 within which an anti-friction bearing structure 9 is positioned. This hollowed out portion 8 of the drive shaft is increased in diameter, as at 10, to form a concentric enlargement of the hollowed out portion. An annular set of clutch teeth 11 is formed on the inner wall of this portion 10 and in radial alignment with the set of clutch teeth 7.

The driven shaft C projects through the rear end of the gear casing or housing A in axial alignment with the drive shaft B. The outer end 12 of this driven shaft is adapted to have suitably secured thereto a driving collar or flange 13 for connection with the element or elements to be driven from the transmission, such as the rear wheels of a motor vehicle. The interior or intermediate portion of the driven shaft C is splined at 14 and this spline formation extends substantially the full length of the same. The inner extremity of the driven shaft is reduced in diameter at 15 for entering the anti-friction bearing structure 9 mounted in the pocketed portion 8 of the drive shaft. This telescopic arrangement of the adjacent ends of the drive and driven shafts permits the same to support each other through the medium of the anti-friction bearing 9 for maintaining relative axial alignment and for permitting relative rotation.

A gear 16 is mounted upon the driven shaft C and is supported by the latter in a manner to permit relative rotation thereto. The details of this mounting are not illustrated as they form no specific part of this invention. It is sufficient to say that the gear 16 is mounted for rotation relative the driven shaft in any suitable conventional manner. The gear 16, however, is not permitted to have axial movement relative the driven shaft.

Splined upon the driven shaft between the end of the drive shaft and the gear 16 is a clutch element 17. This element is permitted to have axial movement relative to the driven shaft. The opposite ends of the clutch element 17 are formed with sets of clutch teeth 18 and 19, respectively. Intermediate these sets of clutch teeth, the clutch element 17 is formed with a plurality of cam surfaces 20 which are preferably equi-spaced around the periphery of the clutch element 17. This specific structure is best illustrated in Figure 2. These cam surfaces 20 each have associated therewith a plurality of wedging rollers 21 which progressively vary in diameter. At one end of each set or series of rollers 21 a follower 22 is provided. This follower is urged toward its rollers by means of a spring 23 which is pocketed at 24 in the follower 22 at one end and is received at its remaining end in a pocket 25 formed in an abutment 26 on the inner clutch member 17.

It will be noted by inspecting Figure 2 that each cam surface 20 has associated therewith a set of rollers 21, a follower 22 and a spring 23. The action of the followers 22 with their spring 23 is to force the sets of rollers toward the shallow ends 27 of the cam surfaces. Suitable retaining elements 28 are provided for preventing unintentional removal of the sets of rollers and followers from the cam surfaces.

A shifter collar 29 surrounds the clutch element 17 with its various sets of rollers 21 and followers 22. The shifter collar is formed at its opposite ends with sets of clutch teeth 30 and 31. The clutch teeth 30 are designed to cooperate with a set of clutch teeth 32 formed on an integral enlarged portion 33 of the gear 16. This enlarged portion 33 is hollowed out and is formed with a set of clutch teeth corresponding with the teeth 11 formed on the drive shaft B. The inner set of clutch teeth for the portion 33 is adapted to cooperate with the set of clutch teeth 18 formed on the clutch member 17. The set of clutch teeth 31 formed on the shifter collar 29 is adapted to associate with the set of clutch teeth 7 formed on the drive shaft B.

A shiftable gear 34 is positioned on the driven shaft C and is splined thereto for effecting first and reverse speeds.

The countershaft E has rotatably positioned thereupon a sleeve F which carries a gear 36 constantly meshing with the gear 6 formed on the drive shaft B. A gear 37 is carried by the sleeve F and constantly meshes with the gear 16 rotatably supported on the driven shaft C. Gears 38 and 39 also are carried by the sleeve F. The shiftable gear 34 on the driven shaft is adapted for movement into mesh with the gear 38 or with an idler pinion 35, meshing with the gear 39 for producing first and reverse speed drives.

This transmission is designed for producing three forward speed drives and a single drive in a reverse direction. First or low speed drive is established by shifting the gear 34 into mesh with the gear 38. The sleeve F then will be driven through its connection with the drive shaft by the meshing gears 6 and 36. The meshing gears 34 and 38 will complete the drive connection to the driven shaft C.

When second or intermediate speed is desired, the clutch collar 29 is shifted toward the loose gear 16 through the medium of a shifter fork 40 which is connected to a shifter control 41. The collar is moved until its set of teeth 30 meshes with the set of teeth 32 formed on the exterior of the portion 33 of the gear 16. The second speed drive then is from the drive shaft B through the gears 6 and 36 to the sleeve F and from this sleeve through the gear 37 to the gear 16. The meshing clutch teeth 32 and 30 on the gear 16 and the clutch collar 29 establish a driving connection between this gear and the said collar. The clutch collar 29 then will be rotated in the direction of the arrow in Figure 2 which will cause the rollers 21 to wedge between the collar 29 and the inner clutch element 17 for interlocking these two members and for driving the clutch element 17. This element is splined to the driven shaft C and, of course, will cause the driven shaft to rotate in the same direction of rotation as that of the drive shaft. If, for any reason, the driven shaft overruns or is driven at a higher rate of speed than that produced by its driving connection with the drive shaft, the inner clutch element 17 will rotate relative to the clutch collar 29 in the direction of the arrow in Figure 2. This movement of the inner clutch element 17 will shift the cam surfaces 20 relative to the wedging rollers 21 and will cause these rollers to be shifted to break their wedging connection between the cam or clutch element 17 and the shifter collar 29. The driven shaft C with its clutch element 17, therefore, will be permitted to rotate independently of the clutch collar 29 and the gear 16. When the speed of rotation of the driven shaft drops back to the speed at which it will be driven from the drive shaft, the clutch will again take up the drive.

When it is desired to prevent this overrunning in second speed, the shifter collar 29 is moved to a greater extent toward the gear 16, and the set of clutch teeth 18, formed on the clutch element 17, will mesh with the set of clutch teeth formed on the interior of the enlarged portion 33 of the gear 16. The drive then will be from the gear 16 directly to the clutch element 17 and from this element directly to the driven shaft C with the result that the one-way acting clutch structure will be cut out of the connection.

To produce third or high speed, the clutch collar 29 is shifted toward the drive shaft B until the set of clutch teeth 31 engages the clutch teeth 7 on the enlarged portion of the drive shaft. The drive then will be from the drive shaft through the teeth 7 and 31 to the clutch collar 29 and through the sets of rollers 21 to the inner cam member 17 which is splined to the driven shaft C. As described in connection with the second or intermediate speed drive, the driven shaft, with the connection through the rollers 21, will be permitted to overrun under its own momentum relative the drive shaft. This overrunning is brought about by force supplied to the driven shaft which will cause the inner clutch member 17 to be shifted in the direction of the arrow in Figure 2 relative the shifter collar 29. This relative movement will compress the springs 23 for permitting the followers 22 and the sets of rollers to shift relative the cam surfaces 20 toward the deeper ends of these surfaces. When the speed of rotation of the driven shaft drops back to the speed of rotation of the drive shaft, the springs 23 will function to move the followers 22 and thereby the rollers 21 so that the latter will again wedge between the cam member 17 and the shifter collar 29.

When it is desired to prevent this overrunning of the driven shaft relative to the drive shaft, the shifter collar 29 is moved to a greater extent toward the drive shaft B and until the set of clutch teeth 19, formed on the clutch member 17, engages the set of clutch teeth 11 formed on the interior of the enlarged portion of the drive shaft. The drive shaft then will be locked against relative movement with respect to the clutch member 17 and, due to the splined connection between this clutch member and the driven shaft, the driven shaft will be rotated at the same speed as that of the drive shaft and will be prevented from overrunning relative the drive shaft.

To provide for a drive in the reverse direction, the gear 34 is moved into mesh with the idler pinion 35 which is positioned beyond the gear 39 and is in mesh therewith. The reverse drive extends from the drive shaft B through the gears 6 and 36 to the sleeve F and from the gear 39 through the idler pinion 35 to the gear 34 splined to the driven shaft C.

In variable speed transmissions, the various sets of driving gears normally are lubricated by being submerged in a bath of lubricant contained in the housing A. The relative rotation of the gears sets up a splashing action which thoroughly distributes the lubricant and lubricates all of the gears. It has been determined that this normal splash of lubricant is not sufficient to lubricate the elements of the overrunning clutch structure and for this reason a force feed is necessary.

A pump H is provided for this purpose and is housed in the hollowed out portion 8 of the drive shaft between the inner end of this hollowed out portion and the adjacent end of the driven shaft. This pump includes a casing portion 42 of circular exterior formation which is fitted into the hollowed out portion 8 of the drive shaft and is secured therein in any desired manner. Eccentrically positioned within this casing 42 is a pump chamber 43 receiving a rotor 44. The rotor is concentrically arranged with respect to the axes of the drive and driven shafts and is formed with a hollow concentric stem or shaft 44a which projects into a pocket 45 formed in the reduced end 15 of the driven shaft C. The rotor is provided with a discharge port 45a communicating with the bore of the stem 44a. Inlets 46 establish communication between the pump chamber 43 and the port 45a. A pair of radially movable veins 47 are carried by the rotor 44 and are urged radially by means of the spring 48 to cause the outer ends of the veins to wipe the circumferential wall of the pump chamber 43. An inlet portion 49 is formed through the pump housing 42 and establishes communication between the pump chamber 43 and an annular groove 50 formed in the inner end of the hollowed out portion 8 of the drive shaft B.

Figure 3:
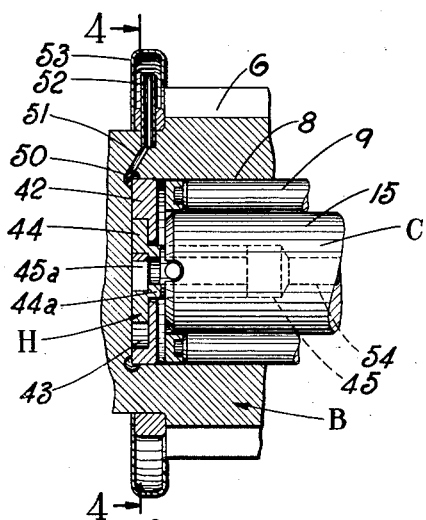
Figure 3 is an enlarged detail view, partly in section and partly in elevation, of a lubricant feeding pump incorporated in the transmission structure illustrated in Figure 1.
Figure 4:
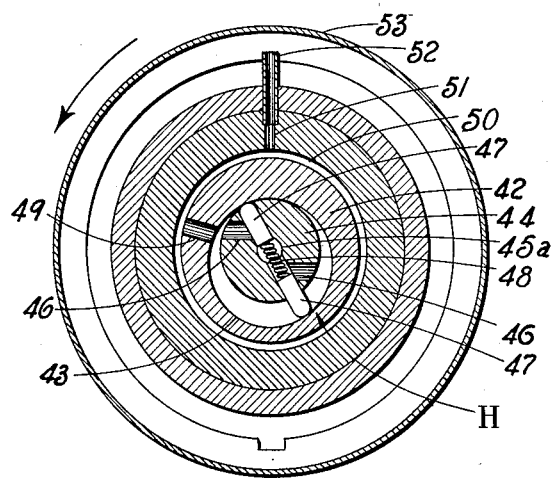
Figure 4 is a transverse sectional view taken upon line 4—4 of Figure 3.

A radially extending passageway 51 connects a radial inlet pipe 52 with the annular groove 50. This pipe 52 and the passage 51 permit lubricant to be supplied to the pump from the exterior of the drive shaft B. The pipe 52 is carried by the drive shaft and projects radially therefrom, as illustrated in Figures 1, 3 and 4 to cooperate with the cup-shaped oil splash guard 53. The splash of lubricant produced by the gears 6 and 36 supplies this guard 53 with lubricant which will be picked up by the pipe 52 and fed into the pump chamber 43.

The driven shaft C is drilled out to provide a system of passageways I. The longitudinal passageway 54, in the present embodiment of the invention, is illustrated as extending longitudinally of the driven shaft to a point within the gear 16. It is to be understood, however, that this passageway may terminate in the region of the clutch structure or may extend beyond its present terminus so as to lubricate the gear 34. In the present embodiment the passageway 54 is provided with a radial branch 55 extending to the interior of the clutch member 17 where it communicates with an annular channel 56 formed in the bore of this clutch element 17. The clutch element 17 is formed with a plurality of ports 57, one port being provided for each of the cam surfaces 20, and said ports establish communication between the channel 56 and the elements associated with the cam surface. A second branch 58 is provided and establishes communication between the passageway 54 and the exterior of the gear 16.

The operation of this lubricant feeding system may be described as follows:

It will be noted that the pump casing or housing 42 is fastened in any desired manner to the drive shaft B so as to rotate therewith. The rotor 44 of the pump is connected to the driven shaft through the medium of the stem 44a and, of course, will rotate with this driven shaft. When the drive and driven shafts rotate relative to each other, the rotor and casing of the pump structure will rotate relative to each other and will cause the lubricant in the chamber 43 to be forced through the passages 46 into the outlet port 45a of the rotor. The lubricant will be fed from this port 45a through the bore of the stem 44a into the longitudinal passageway 54 from which it will be forced outwardly through the branches 55 and 58.

Due to the rotation of the driven shaft, lubricant reaching the branches 55 and 58 also will be fed outwardly by centrifugal force. As stated above, the pump chamber 43 will be supplied with lubricant from the splash guard 53 through the pipe 52 and the passageway 51. The splash guard will be supplied with lubricant by the relatively rotating gears 6 and 36.

It will be noted that the pump will function whenever the drive and driven shafts are rotating relative to each other so that whenever the overrunning clutch may function lubricant is pumped thereto. This relative rotation occurs at all times during the second or intermediate speed drive and occurs during direct drive when the driven shaft is overrunning, under its own momentum, relative to the drive shaft. The one-way acting clutch structure, therefore, will be supplied with lubricant whenever it is functioning in either the second or high speed drives.

It is to be understood that the form of this invention herewith shown and described is to be taken as a preferred example of the same, and that various changes in the shape, size and arrangement of parts may be resorted to without departing from the spirit of the invention or the scope of the sub-joined claims.

What we claim is:

1. A device of the type described comprising a drive shaft, a driven shaft, a clutch structure including rollers for driving the driven shaft from the drive shaft and for permitting the driven shaft to overrun under its own momentum relative the drive shaft, and means operative by relative movement of said shafts for forcing lubricant to said rollers.

2. A device of the type described comprising a drive shaft, a driven shaft, a clutch structure for driving the driven shaft from the drive shaft and for permitting the driven shaft to overrun under its own momentum relative the drive shaft, said clutch structure including a member driven by the drive shaft, a member to be moved into and out of driving connection with the first mentioned member, and a one-way acting clutch connecting the movable member to the driven shaft; and means between said shafts for forcing lubricant to the elements of the one-way acting clutch.

3. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including a one-way acting clutch structure, and means between said shafts for forcing lubricant to the clutch structure.

4. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including a one-way acting clutch structure forming a part of the drives for each of said different speeds and meshing gears for one of the speeds, and means operated by relative rotation of said shafts for forcing lubricant to the clutch structure and also to the meshing gears.

5. A device of the type described comprising a drive shaft, a driven shaft, a clutch structure including rollers for driving the driven shaft from the drive shaft and for permitting the driven shaft to overrun under its own momentum relative the drive shaft, said driven shaft having a passageway for lubricant leading to said rollers, and means operative by relative movement of said shafts for forcing lubricant through the passageway.

6. A device of the type described comprising a drive shaft, a driven shaft, a clutch structure for driving the driven shaft from the drive shaft and for permitting the driven shaft to overrun under its own momentum relative the drive shaft, said clutch structure including a member driven by the drive shaft, a member to be moved into and out of driving connection with the first mentioned member, and a one-way acting clutch connecting the movable member to the driven shaft, said driven shaft having a passageway for lubricant leading to the elements of the clutch, and means operated by relative rotation of said shafts for forcing lubricant through the passageway.

7. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including a one-way acting clutch structure, said driven shaft having a passageway for lubricant leading to the clutch structure, and means operated by relative rotation of said shafts for forcing lubricant through the passageway.

8. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including a one-way acting clutch structure forming a part of the drives for each of said different speeds and meshing gears for one of the speeds, said driven shaft having a passageway system for lubricant leading to the clutch structure and the meshing gears, and means operated by relative rotation of said shafts for forcing lubricant through the passageway system to said clutch structure and meshing gears.

9. A device of the type described comprising a drive shaft, a driven shaft, a clutch structure having parts engageable with said shafts for driving the driven shaft from the drive shaft and for permitting the driven shaft to overrun under its own momentum relative the drive shaft, a pump structure including two relatively rotatable parts which are connected one to each of said shafts to be operated by the relative rotation of said shafts, and means for conducting lubricant from the pump to the clutch structure.

10. A device of the type described comprising a drive shaft, a driven shaft, a clutch structure for driving the driven shaft from the drive shaft and for permitting the driven shaft to overrun under its own momentum relative the drive shaft, said clutch structure including a member driven by the drive shaft, a member to be moved into and out of driving connection with the first mentioned member and a one-way acting clutch connecting the movable member to the driven shaft, a pump structure including two relatively rotatable parts which are connected one to each of said shafts to be operated by the relative rotation of said shafts, and means for conducting lubricant from the pump to the elements of the clutch.

11. A device of the type described comprising a drive shaft, a driven shaft, means for driving the driven shaft from the the drive shaft at various speeds in one direction and for permitting overrun of the driven shaft under its own momentum relative the drive shaft in either of said speeds, said means including a one-way acting clutch structure, a pump structure including two relatively rotatable parts which are connected one to each of said shafts to be operated by the relative rotation of said shafts, and means for conducting lubricant from the pump to the clutch structure.

12. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including a one-way acting clutch structure forming a part of the drives for each of said different speeds and meshing gears for one of the speeds, a pump structure including two relatively rotatable parts which are connected one to each of said shafts to be operated by the relative rotation of said shafts, and means for conducting lubricant from the pump to the clutch structure and the meshing gears.

13. A device of the type described comprising a transmission casing containing a supply of lubricant, a drive and a driven shaft rotatably mounted in the casing, a clutch structure for driving the driven shaft from the drive shaft and for permitting the driven shaft to overrun under its own momentum relative the drive shaft, said driven shaft having a passageway for lubricant leading to the clutch structure, means operated by relative rotation of said shafts for forcing lubricant through said passageway, and means for supplying the lubricant forcing means with lubricant from the casing.

14. A device of the type described comprising, a drive shaft, a driven shaft co-axial with the drive shaft, the adjacent ends of said shaft being telescopically arranged one within the other, means for driving the driven shaft from the drive shaft at a different speed relative thereto and for permitting overrun of the driven shaft under its own momentum relative to the drive shaft, a pump structure including two relatively rotatable parts connected one to each of said shafts to be operated by the relative rotation of said shafts, one of said shafts having at least one transmission element connected thereto, and means for conducting lubricant from the pump to said element and to said driven shaft driving means.

15. A device of the type described comprising, a drive shaft, a driven shaft, means including a one-way clutch to drive said driven shaft from the drive shaft at a different speed relative thereto and adapted to permit overrun of said driven shaft under its own momentum relative to said drive shaft, a pump between said shafts to be operated by their relative rotation, one of said shafts having at least one transmission element connected thereto, and means for conducting lubricant from the pump to said element and to said clutch.

16. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including meshing gears for one of said speeds, and means operative by the relative rotation of said shafts for forcing lubricant to said gears.

17. A device of the type described comprising a drive shaft, a driven shaft, means for driving the driven shaft from the drive shaft at different speeds in one direction and for permitting overrun of the driven shaft under its own momentum relative the drive shaft in either of said speeds, said means including meshing gears for one of said speeds, said driven shaft having a passageway for lubricant leading to the meshing gears, and means operative by the relative rotation of said shafts for forcing lubricant through said passageway to said gears.

18. A device of the type described comprising a drive shaft, a driven shaft co-axial with the drive shaft, means for driving the driven shaft from the drive shaft at a different speed relative thereto and for permitting overrun of the driven shaft under its own momentum relative to the drive shaft, the adjacent ends of said shafts being telescopically arranged one within the other, a pump structure including two relatively rotatable parts which are connected one to each of said shafts to be operated by the relative rotation of said shafts, one of said shafts having at least one transmission element connected thereto, and means for conducting lubricant from the pump to said element and to said driven shaft driving means.

19. A device of the type described comprising a drive shaft, a driven shaft, a one-way clutch to drive said driven shaft from the drive shaft so as to rotate relative thereto and adapted to overrun the drive shaft under its own momentum, a pump connected to said shafts to be operated by their relative rotation, one of said shafts having at least one transmission element connected thereto, and means for conducting lubricant from the pump to said element and to said clutch.

20. A device of the type described comprising a drive shaft, a driven shaft, means for driving the driven shaft from the drive shaft at various speeds in one direction and for permitting overrun of the driven shaft under its own momentum relative the drive shaft in either of said speeds, said means including meshing gears for one of said speeds, a pump structure including two relatively rotatable parts which are connected one to each of said shafts to be operated by the relative rotation of said shafts, and means for conducting lubricant from the pump to the meshing gears.

21. A device of the type described comprising a drive shaft, a shaft driven from the drive shaft so as to rotate relative thereto, a pump connected to said shafts to be operated by their relative rotation, one of said shafts having at least one transmission element connected thereto, means for conducting lubricant from the pump to said element, a casing enclosing the above-mentioned parts and containing lubricant, and means for supplying the pump with lubricant from the casing.

DELMAR G. ROOS.
HAROLD E. CHURCHILL.